US011110912B2

(12) United States Patent
Isshiki et al.

(10) Patent No.: US 11,110,912 B2
(45) Date of Patent: Sep. 7, 2021

(54) VEHICLE CONTROL DEVICE, AND VEHICLE

(71) Applicant: SHOWA CORPORATION, Saitama (JP)

(72) Inventors: Ken Isshiki, Tochigi (JP); Eishi Ishimaru, Tochigi (JP); Kyouichi Tagami, Tochigi (JP); Katsutoshi Yokoi, Tochigi (JP)

(73) Assignee: SHOWA CORPORATION, Saitama (JP)

( * ) Notice: Subject to any disclaimer, the term of this patent is extended or adjusted under 35 U.S.C. 154(b) by 240 days.

(21) Appl. No.: 16/538,373

(22) Filed: Aug. 12, 2019

(65) Prior Publication Data
US 2019/0359203 A1 Nov. 28, 2019

Related U.S. Application Data

(63) Continuation of application No. PCT/JP2017/017250, filed on May 2, 2017.

(30) Foreign Application Priority Data

Mar. 24, 2017 (JP) .............................. JP2017-059884

(51) Int. Cl.
*B60W 30/02* (2012.01)
*B60W 10/20* (2006.01)
*B60W 10/22* (2006.01)

(52) U.S. Cl.
CPC .......... *B60W 30/025* (2013.01); *B60W 10/20* (2013.01); *B60W 10/22* (2013.01);
(Continued)

(58) Field of Classification Search
CPC .... B60W 30/025; B60W 10/20; B60W 10/22; B60W 2710/226; B60W 2520/125;
(Continued)

(56) References Cited

U.S. PATENT DOCUMENTS 5,444,621 A 8/1995 Matsunaga et al.
2010/0114431 A1* 5/2010 Switkes .............. B60T 8/17557
701/41
(Continued)

FOREIGN PATENT DOCUMENTS

DE  10 2008 053 008 A1  10/2009
JP       1-141113         6/1989
(Continued)

OTHER PUBLICATIONS

Office Action for DE Application No. 112017007306.5, dated Jan. 28, 2021, 6 pages.
(Continued)

*Primary Examiner* — Mary Cheung
(74) *Attorney, Agent, or Firm* — Casimir Jones, S.C.; Robert A. Goetz

(57) ABSTRACT

An embodiment of the present invention provides higher ride comfort to a driver in control of steering and suspension. An ECU (600) includes: a steering control section (610) which controls a magnitude of an assist torque or a reaction torque; and a suspension control section (650) which controls a damping force of a suspension. The steering control section (610) refers to a state of a vehicle which state is predicted by the suspension control section (650), and the suspension control section (650) refers to a steering torque.

14 Claims, 8 Drawing Sheets

(52) U.S. Cl.
CPC . *B60W 2510/202* (2013.01); *B60W 2520/125* (2013.01); *B60W 2520/18* (2013.01); *B60W 2710/202* (2013.01); *B60W 2710/226* (2013.01)

(58) Field of Classification Search
CPC ..... B60W 2510/202; B60W 2710/202; B60W 2520/18; B60W 30/02; B60W 2520/10; B60W 2540/18
See application file for complete search history.

(56) References Cited

U.S. PATENT DOCUMENTS

| | | | |
|---|---|---|---|
| 2011/0208391 A1 | 8/2011 | Mizuta et al. | |
| 2013/0197755 A1 | 8/2013 | Otake et al. | |
| 2014/0093128 A1 | 4/2014 | Teshima | |
| 2014/0297119 A1* | 10/2014 | Giovanardi | B60G 17/016 701/38 |
| 2016/0031481 A1 | 2/2016 | Kentaro et al. | |
| 2018/0162335 A1* | 6/2018 | Hwang | B60T 8/17558 |
| 2018/0265158 A1* | 9/2018 | Hara | B62K 5/027 |

FOREIGN PATENT DOCUMENTS

| | | |
|---|---|---|
| JP | 4-56616 | 2/1992 |
| JP | 5-229328 | 9/1993 |
| JP | 6-48139 | 2/1994 |
| JP | 6-48288 | 2/1994 |
| JP | 6-219307 | 8/1994 |
| JP | 7-156628 | 6/1995 |
| JP | 7-277167 | 10/1995 |
| JP | 8-108723 | 4/1996 |
| JP | 11-139131 | 5/1999 |
| JP | 2000-233664 | 8/2000 |
| JP | 2003-137121 | 5/2003 |
| JP | 2004-142550 | 5/2004 |
| JP | 2004-291815 | 10/2004 |
| JP | 2006-008055 | 1/2006 |
| JP | 2006-123827 | 5/2006 |
| JP | 2006-273185 | 10/2006 |
| JP | 2007-038766 | 2/2007 |
| JP | 2008-179300 | 8/2008 |
| JP | 2008-231989 | 10/2008 |
| JP | 2009-101809 | 5/2009 |
| JP | 2010-116073 | 5/2010 |
| JP | 2010234869 A * | 10/2010 |
| JP | 2012-101666 | 5/2012 |
| JP | 2013-107628 | 6/2013 |
| JP | 2013-212715 | 10/2013 |
| JP | 2016-022830 | 2/2016 |
| JP | 2016-104632 | 6/2016 |
| JP | 2016-210352 | 12/2016 |
| WO | WO 2010/092687 | 8/2010 |

OTHER PUBLICATIONS

1st Office Action for 2017-059880, dated Jun. 6, 2017, 3 pages.
1st Office Action for 2017-059882, dated Jun. 13, 2017, 3 pages.
1st Office Action for 2017-059883, dated Jun. 13, 2017, 3 pages.
1st Office Action for 2017-059884, dated Jun. 6, 2017, 3 pages.
2nd Office Action for 2017-059880, dated Sep. 26, 2017, 2 pages.
2nd Office Action for 2017-059882, dated Oct. 24, 2017, 2 pages.
2nd Office Action for 2017-059883, dated Oct. 24, 2017, 2 pages.
2nd Office Action for 2017-059884, dated Sep. 26, 2017, 4 pages.
English Translation of International Preliminary Report on Patentability for PCT/JP2017/017246, dated Oct. 3, 2019, 9 pages.
English Translation of International Preliminary Report on Patentability for PCT/JP2017/017248, dated Oct. 3, 2019, 8 pages.
English Translation of International Preliminary Report on Patentability for PCT/JP2017/017249, dated Oct. 3, 2019, 11 pages.
English Translation of International Preliminary Report on Patentability for PCT/JP2017/017250, dated Oct. 3, 2019, 8 pages.
International Search Report for PCT/JP2017/017246, dated Jun. 27, 2017, 2 pages.
International Search Report for PCT/JP2017/017248, dated Jun. 13, 2017, 2 pages.
International Search Report for PCT/JP2017/017249, dated Jun. 13, 2017, 2 pages.
International Search Report for PCT/JP2017/017250, dated Jun. 27, 2017, 2 pages.

* cited by examiner

VEHICLE CONTROL DEVICE, AND VEHICLE

This application is a Continuation of PCT International Application No. PCT/JP2017/017250 filed in Japan on May 2, 2017, which claims the benefit of Patent Application No. 2017-059884 filed in Japan on Mar. 24, 2017, the entire contents of which are hereby incorporated by reference.

TECHNICAL FIELD

The present invention relates to a vehicle control device for controlling a vehicle, and to the vehicle.

BACKGROUND ART

Steering devices which apply an assist torque or a reaction torque to a steering member have been known. Further, in relation to steering devices, for example, Patent Literature 1 discloses a technique for correcting a desired assist current on the basis of a difference between a desired steering speed and an actual steering speed, and Patent Literature 2 discloses a technique for determining a steering condition of a steering wheel on the basis of a direction of steering torque and a rotation direction of an assist motor.

Meanwhile, suspension devices capable of controlling damping force have been known. For example, Patent Literatures 3 and 4 each disclose a suspension device which controls damping force in accordance with steering torque.

CITATION LIST

Patent Literature

[Patent Literature 1] Japanese Patent Application Publication, Tokukai, No. 2006-123827 (Publication Date: May 18, 2006)

[Patent Literature 2] Japanese Patent Application Publication, Tokukai, No. 2013-212715 (Publication Date: Oct. 17, 2013)

[Patent Literature 3] Japanese Patent Application Publication, Tokukai, No. 2010-116073 (Publication Date: May 27, 2010)

[Patent Literature 4] Japanese Patent Application Publication, Tokukaihei, No. H1-141113 (Publication Date: Jun. 2, 1989)

SUMMARY OF INVENTION

Technical Problem

It is preferable that control of steering and suspension provide higher ride comfort.

An object of an embodiment of the present invention is to provide control of steering and suspension which control increases driver's ride comfort.

Solution to Problem

In order to attain the above object, an embodiment of the present invention is directed to a vehicle control device for controlling a vehicle, including: a first control section configured to control a magnitude of an assist torque or reaction torque to be applied to a steering device for steering the vehicle, with reference to at least a steering torque applied to a steering member; and a second control section configured to control a damping force of a suspension of the vehicle, the first control section controlling the magnitude of the assist torque or reaction torque, additionally with reference to information obtained or calculated by the second control section, and the second control section controlling the damping force of the suspension of the vehicle, additionally with reference to the steering torque or information obtained or calculated by the first control section.

Further, in order to attain the above object, an embodiment of the present invention is directed to a vehicle including: a vehicle control device configured to control the vehicle; a torque applying section configured to apply an assist torque or reaction torque to a steering member; and a suspension, the vehicle control device including: a first control section configured to control a magnitude of the assist torque or reaction torque to be applied to the steering member, with reference to at least a steering torque applied to the steering member; and a second control section configured to predict a state of the vehicle and control a damping force of the suspension of the vehicle, with reference to at least the state of the vehicle, the first control section controlling the magnitude of the assist torque or reaction torque, additionally with reference to the state of the vehicle, the state of the vehicle having been predicted by the second control section, the second control section controlling the damping force of the suspension of the vehicle, additionally with reference to the steering torque, the torque applying section applying the assist torque or reaction torque to the steering member, in accordance with a control signal supplied from the first control section, and the suspension varying the damping force in accordance with another control signal supplied from the second control section.

Advantageous Effects of Invention

An embodiment of the present invention makes it possible to provide control of steering and suspension which control increases driver's ride comfort.

DESCRIPTION OF EMBODIMENTS

Embodiment 1

The following description will discuss Embodiment 1 of the present invention in detail.

(Configuration of Vehicle 900)

Figure 1:
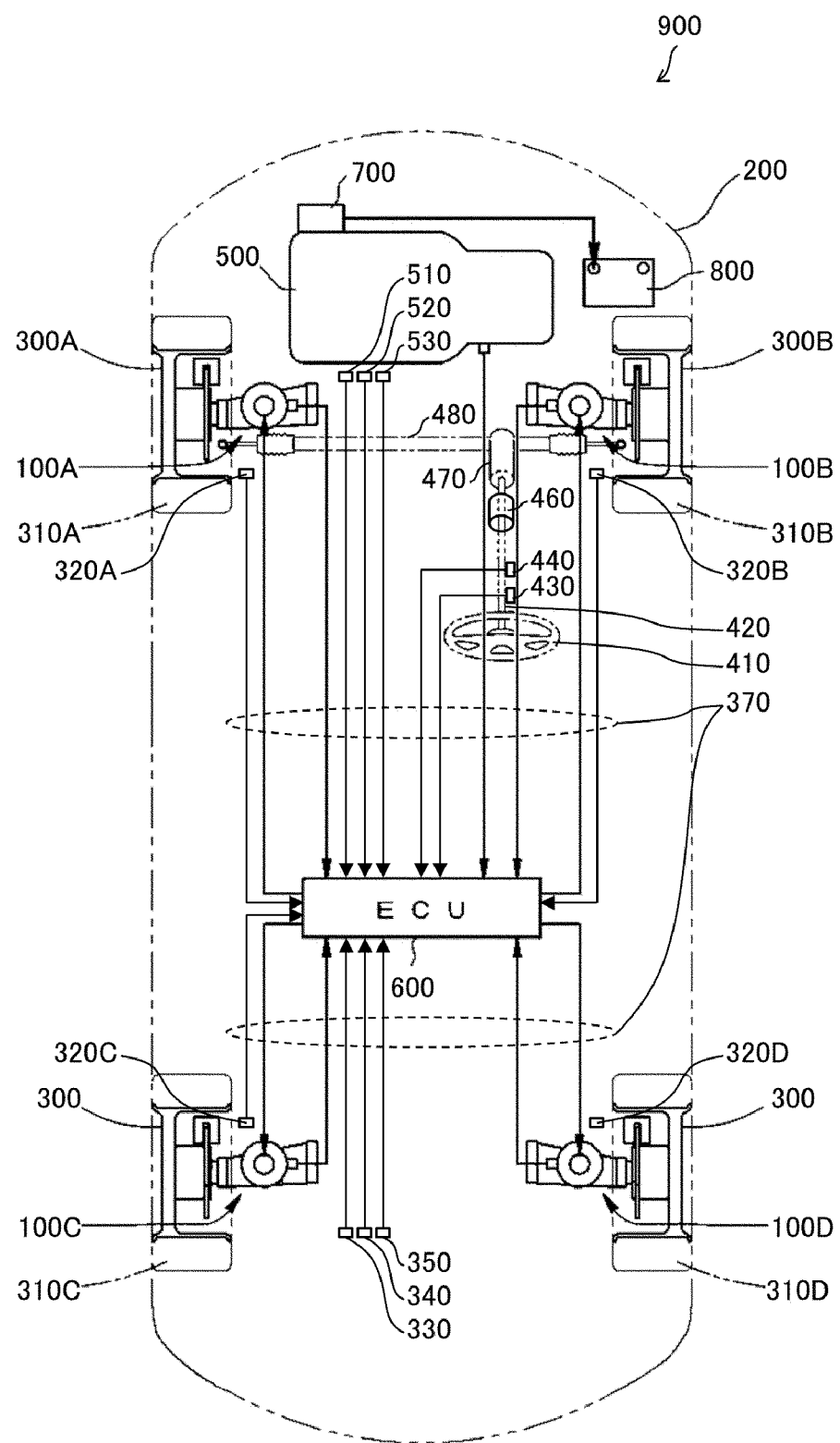
FIG. 1 is a diagram schematically illustrating a configuration of a vehicle in accordance with an embodiment of the present invention.

FIG. 1 is a diagram schematically illustrating a configuration of a vehicle 900 in accordance with Embodiment 1 of the present invention. As illustrated in FIG. 1, the vehicle 900 includes suspensions 100, a vehicle body 200, wheels 300, tires 310, a steering member 410, a steering shaft 420, a torque sensor 430, a steering angle sensor 440, a torque applying section 460, a rack and pinion mechanism 470, a rack shaft 480, an engine 500, an electronic control unit (ECU) (vehicle control device) 600, a power-generating device 700 and a battery 800. Here, the suspensions 100 and the ECU 600 constitute a suspension device in accordance with Embodiment 1. Note that the vehicle 900 does not necessarily include all of the above components and can include some of the above components. Further, each component described here can be replaced by a well-known component.

The wheels 300 to which the tires 310 are attached are suspended on the vehicle body 200 by the suspension 100. Since the vehicle 900 is a four-wheeled vehicle, four of a set including a suspension 100, a wheel 300, and a tire 310 are provided.

Note that each of a left front wheel, a right front wheel, a left rear wheel, and a right rear wheel includes a tire and a wheel, which are referred to as a tire 310A and a wheel 300A, a tire 310B and a wheel 300B, a tire 310C and a wheel 300C, or a tire 310D and a wheel 300D. Similarly, respective configurations associated with the left front wheel, the right front wheel, the left rear wheel, and the right rear wheel are denoted by signs "A", "B", "C", and "D".

The suspension 100 includes a hydraulic shock absorber, an upper arm and a lower arm. Further, the hydraulic shock absorber includes a solenoid valve which is an electromagnetic valve for adjusting a damping force which is caused by the hydraulic shock absorber. This, however, by no means limits Embodiment 1. The hydraulic shock absorber can employ an electromagnetic valve other than the solenoid valve, as the electromagnetic valve for adjusting a damping force. For example, the hydraulic shock absorber can be configured to include, as the electromagnetic valve, an electromagnetic valve which utilizes electromagnetic fluid (magnetic fluid).

The power-generating device 700 is attached to the engine 500. Power generated by the power-generating device 700 is accumulated in the battery 800

The steering member 410 which a driver operates is connected to one end of the steering shaft 420 so as to be capable of transmitting torque. Meanwhile, the other end of the steering shaft 420 is connected to the rack and pinion mechanism 470.

The rack and pinion mechanism 470 is a mechanism for converting rotation of the steering shaft 420 about an axis of the steering shaft 420 to displacement of the rack shaft 480 along a direction of an axis of the rack shaft 480. When the rack shaft 480 is displaced along the direction of the axis of the rack shaft 480, the wheel 300A and the wheel 300B are turned via a tie rod and a knuckle arm.

The torque sensor 430 detects a steering torque which is applied to the steering shaft 420, that is, a steering torque which is applied to the steering member 410, and supplies, to the ECU 600, a torque sensor signal indicative of a result of this detection. More specifically, the torque sensor 430 detects a torsion of a torsion bar, which is provided in the steering shaft 420, and outputs a result of this detection as the torque sensor signal. Note that the torque sensor 430 can be a well-known sensor such as a hall IC, an MR element, or a magnetostrictive torque sensor.

The steering angle sensor 440 detects a steering angle of the steering member 410, and supplies a result of this detection to the ECU 600.

The torque applying section 460 applies, to the steering shaft 420, an assist torque or a reaction torque in accordance with a steering control variable which is supplied from the ECU 600. The torque applying section 460 includes a motor for generating the assist torque or the reaction torque in accordance with the steering control variable, and a torque transmission mechanism for transmitting the torque generated by the motor to the steering shaft 420.

Note that, specific examples of the "control variable" herein encompass a current value, a duty ratio, a damping rate, and a damping ratio.

The steering member 410, the steering shaft 420, the torque sensor 430, the steering angle sensor 440, the torque applying section 460, the rack and pinion mechanism 470, the rack shaft 480, and the ECU 600 constitute a steering device in accordance with Embodiment 1.

Note that the expression "connected . . . so as to be capable of transmitting torque" in the above description means that two members are connected to each other such that rotation of one of the two members causes rotation of the other one of the two members. Example cases of such a connection encompass at least a case where the two members are integrally formed, a case where one of the two members is directly or indirectly fixed to the other one of the two members, and a case where the two members are connected to each other via a joint member or the like so as to interlock with each other.

Though steering devices described as examples above are each a steering device in which members from the steering member 410 to the rack shaft 480 are always mechanically connected to one another, this configuration by no means limits Embodiment 1. The steering device in accordance with Embodiment 1 can be, for example, a steering device of a steering by wire system. The matters described below in the present specification are applicable to steering devices of a steering by wire system.

The ECU 600 carries out overall control of various electronic devices of the vehicle 900. More specifically, the ECU 600 controls a magnitude of the assist torque or the reaction torque to be applied to the steering shaft 420, by adjusting the steering control variable to be supplied to the torque applying section 460.

Further, the ECU 600 supplies a suspension control variable to the solenoid valve which is provided in the hydraulic shock absorber in the suspension 100, so as to control opening/closing of the solenoid valve. In order to allow for this control, an electrical power line is provided. The electric power line is used for supplying a drive power from the ECU 600 to the solenoid valve.

Further, the vehicle 900 includes a wheel speed sensor 320 which is provided for each of the wheels 300 and detects a wheel speed of each wheel 300, a lateral G sensor 330 which detects an acceleration in a lateral direction of the vehicle 900, a longitudinal G sensor 340 which detects an acceleration in a longitudinal direction of the vehicle 900, a yaw rate sensor 350 which detects a yaw rate of the vehicle 900, an engine torque sensor 510 which detects a torque generated by the engine 500, an engine speed sensor 520 which detects the number of rotations of the engine 500, and a brake pressure sensor 530 which detects a pressure applied to brake fluid provided in a brake device. Results of detection by the above various sensors are supplied to the ECU 600.

Note that though not illustrated, the vehicle 900 includes a brake device which can be controlled by an antilock brake system (ABS), a traction control system (TCS), and a vehicle stability assist (VSA). The antilock brake system (ABS) prevents the wheels from locking up in breaking. The traction control system (TCS) prevents wheel slip of the wheels in acceleration of the vehicle 900. The vehicle stability assist (VSA) is a control system for stabilizing vehicle behavior, which system has an automatic braking function for, for example, yaw moment control in turning and a brake assist function.

The ABS, TCS, and VSA here compare a wheel speed determined in accordance with an estimated vehicle body speed and a wheel speed detected by the wheel speed sensor 320, and determines that the vehicle 900 is slipping in a case where a difference between respective values of these two wheel speeds is not less than a predetermined value. The ABS, the TCS, and the VSA are intended to stabilize the behavior of the vehicle 900, by carrying out the most appropriate brake control and traction control in accordance with a running state of the vehicle 900 through the above process.

Further, supply of the results of detection by the above various sensors to the ECU 600 and transmission of control signals from the ECU 600 to each section are carried out via a controller area network (CAN) 370.

(Suspension 100)

Figure 2:
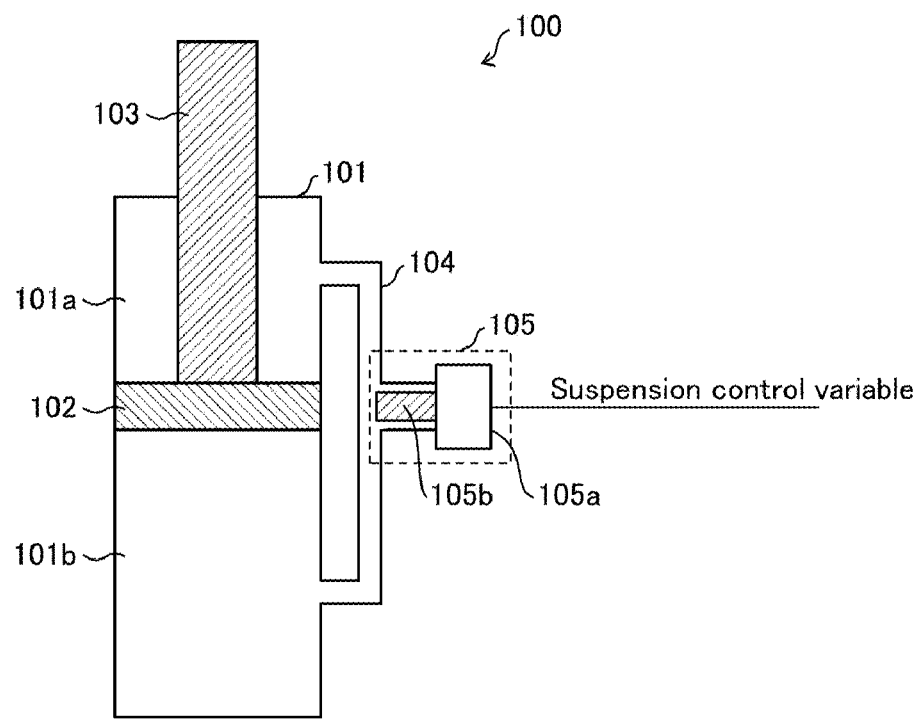
FIG. 2 is a cross-sectional view schematically illustrating an example configuration of a hydraulic shock absorber in a suspension in accordance with an embodiment of the present invention.

FIG. 2 is a cross-sectional view schematically illustrating an example configuration of the hydraulic shock absorber in the suspension 100 in accordance with Embodiment 1. As illustrated in FIG. 2, the suspension 100 includes a cylinder 101, a piston 102 provided in the cylinder 101 so as to be slidable, and a piston rod 103 which is fixed to the piston 102. The cylinder 101 is partitioned into an upper chamber 101a and a lower chamber 101b by the piston 102, and the upper chamber 101a and the lower chamber 101b are filled with hydraulic oil.

Moreover, as illustrated in FIG. 2, the suspension 100 includes a communicating path 104 which allows the upper chamber 101a and the lower chamber 101b to communicate with each other. In the communicating path 104, a solenoid valve 105 is provided. The solenoid valve 105 adjusts a damping force of the suspension 100.

The solenoid valve 105 includes a solenoid 105a and a valve 105b. The valve 105b is driven by the solenoid 105a, and changes a cross-sectional area of a fluid channel of the communicating path 104.

The solenoid 105a causes the valve 105b to stretch/retract in accordance with the suspension control variable supplied from the ECU 600. This changes the cross-sectional area of the fluid channel of the communicating path 104 and consequently changes the damping force of the suspension 100.

(ECU 600)

Figure 3:
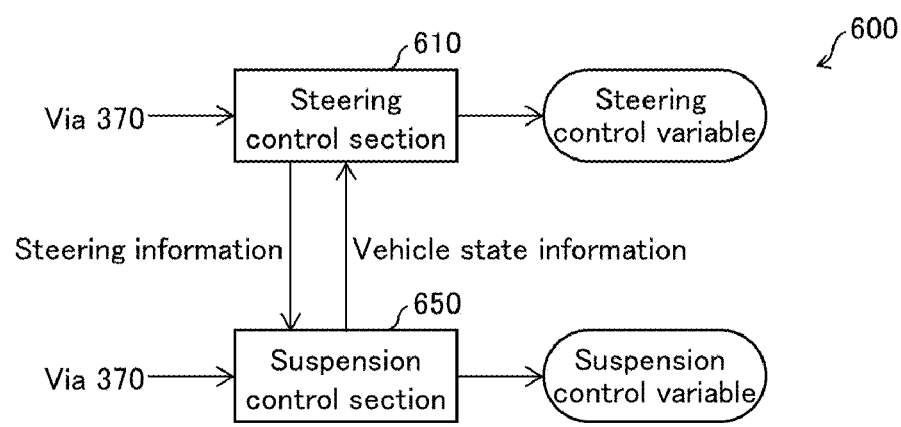
FIG. 3 is a block diagram schematically illustrating an ECU in accordance with an embodiment of the present invention.

The following will specifically discuss the ECU 600 with reference to another drawing. FIG. 3 is a diagram schematically illustrating the ECU 600.

As illustrated in FIG. 3, the ECU 600 includes a steering control section (first control section) 610 and a suspension control section (second control section) 650. The steering control section 610 and the suspension control section 650 may be collectively referred to as a steering and suspension control device.

The steering control section 610 refers to the results of detection by the various sensors in the CAN 370, and determines a level of the steering control variable which is to be supplied to the torque applying section 460.

Note that as used herein, the wording "referring to" may mean "using", "considering", "depending on" or the like.

The suspension control section 650 refers to the results of detection by the various sensors in the CAN 370, and determines a level of the control variable which is to be supplied to the solenoid valve provided in the hydraulic shock absorber of the suspension 100.

Further, as illustrated in FIG. 3, in the ECU 600, vehicle state information obtained or calculated by the suspension control section 650 is supplied to the steering control section 610. Then, the steering control section 610 refers to the vehicle state information so as to determine the level of the steering control variable. Further, steering information obtained or calculated by the steering control section 610 is supplied to the suspension control section 650. Then, the suspension control section 650 refers to the steering information so as to determine the damping force of the suspension.

Note that examples of the steering information encompass a steering torque, a steering angle, a rack displacement, a rack thrust, etc. Meanwhile, examples of the vehicle state information encompass various kinds of information such as roll, pitch, and yaw and a vehicle state which is predicted on the basis of those various kinds of information.

In Embodiment 1, the steering information is a steering torque signal, and the vehicle state information is a roll rate value.

Note that as described later, the roll rate value can be configured to express a roll rate as a shift from a reference value of "0" which is a value in a case where inclination of the vehicle 900 has not changed for a predetermined minute time.

Further, the process of "determining a level of the control variable" includes a case where the level of the control variable is set to zero, that is, a case where no control variable is supplied.

Note that the ECU 600 can be configured to include the steering control section 610 and the suspension control section 650 as an integrated unit, or alternatively can be configured to include separate ECUs which realize the steering control section 610 and the suspension control section 650, respectively. In the latter case, the steering control section 610 and the suspension control section 650 communicate with each other by use of communication means, so that control described in the present specification is carried out.

(Steering Control Section)

Figure 4:
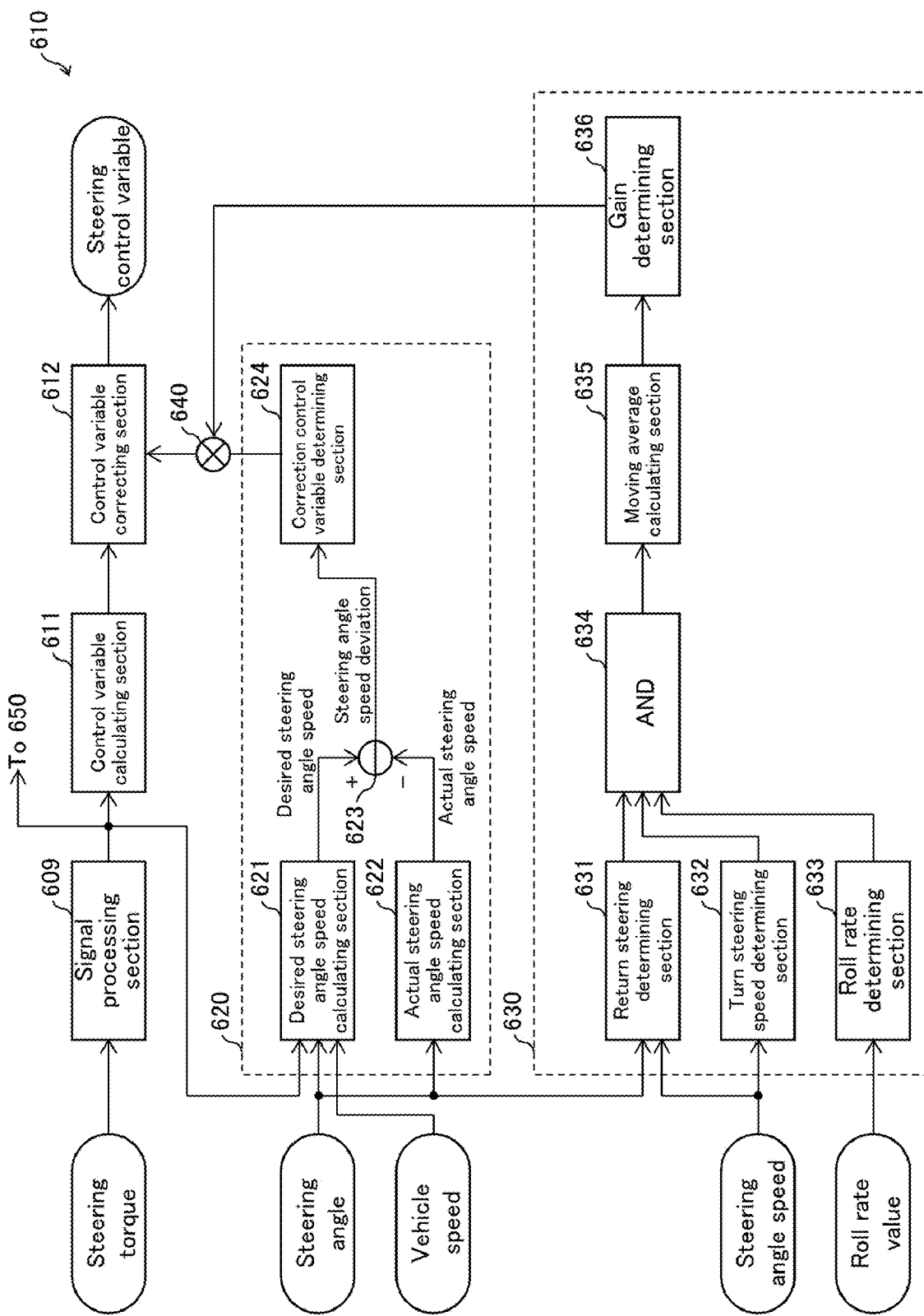
FIG. 4 is a block diagram illustrating an example configuration of a steering control section in accordance with an embodiment of the present invention.

Next, the following will more specifically discuss the steering control section 610 with reference to FIG. 4. FIG. 4 is a block diagram illustrating an example configuration of the steering control section 610.

As illustrated in FIG. 4, the steering control section 610 includes a signal processing section 609, a control variable calculating section 611, a control variable correcting section 612, a (A) feedback section 620, a gain calculating section 630, and a multiplying section 640.

The signal processing section 609 performs signal processing with respect to the steering torque signal indicative of the steering torque. The signal processing can include phase compensation processing with respect to the steering torque signal. It can be expected that this configuration will achieve higher ride comfort.

The control variable calculating section 611 calculates a control variable for controlling the magnitude of the assist torque or the reaction torque, with reference to the steering torque supplied from the signal processing section 609. The control variable calculated by the control variable calculating section 611 is supplied to the torque applying section 460 as the steering control variable, after the control variable is corrected by the control variable correcting section 612.

(ω Feedback Section)

The ω feedback section 620 determines a value of a correction control variable, with reference to the steering angle supplied from the steering angle sensor 440, a vehicle speed determined on the basis of the wheel speed detected by the wheel speed sensor 320, and the steering torque supplied from the torque sensor 430.

The ω feedback section 620 includes, for example, a desired steering angle speed calculating section 621, an actual steering angle speed calculating section 622, a subtracting section 623, and a correction control variable determining section 624, as illustrated in FIG. 4.

The desired steering angle speed calculating section 621 calculates a desired steering angle speed, with reference to the steering angle supplied from the steering angle sensor 440, the vehicle speed determined on the basis of the wheel speed detected by the wheel speed sensor 320, and the steering torque supplied from the signal processing section 609. A specific method of calculating the desired steering angle speed here by no means limits Embodiment 1. The desired steering angle speed calculating section 621 can be configured to refer to a desired steering angle speed map and a torque ratio map in calculating the desired steering angle speed.

The actual steering angle speed calculating section 622 specifies the actual steering angle by calculating a change over time in steering angle supplied from the steering angle sensor 440.

The subtracting section 623 subtracts the actual steering angle calculated by the actual steering angle speed calculating section 622, from the desired steering angle speed calculated by the desired steering angle speed calculating section 621, and supplies, to the correction control variable determining section 624, a deviation of steering angle speed which deviation is a result of the above subtraction.

The correction control variable determining section 624 determines the value of the correction control variable in accordance with the deviation of steering angle speed. A specific method of determining the value of the correction control variable by no means limits Embodiment 1. The correction control variable determining section 624 can be configured to refer to a steering angle speed deviation correction control variable map in determining the value of the correction control variable.

(Gain Calculating Section)

The gain calculating section 630 calculates a gain coefficient by which the correction control variable calculated by the (A) feedback section 620 will be multiplied, with reference to the steering angle supplied from the steering angle sensor 440 and the roll rate value supplied from the suspension control section 650.

The gain calculating section 630 includes, for example, a return steering determining section 631, a turn steering speed determining section 632, a roll rate determining section 633, a logical conjunction calculating section 634, a moving average calculating section 635, and a gain determining section 636, as illustrated in FIG. 4.

The return steering determining section 631 determines whether or not the steering member 410 is in a return steering state, with reference to the steering angle supplied from the steering angle sensor 440 and the steering angle speed calculated with reference to the steering angle. In a case where the steering member 410 is in the return steering state, the return steering determining section 631 outputs "1" as a determination result or otherwise, outputs "0" as a determination result. Note that the vehicle 900 can be configured to include a steering angle speed sensor and then, the return steering determining section 631 can be configured to determine whether or not the steering member 410 is in the return steering state, with reference to the steering angle supplied from the steering angle sensor 440 and the steering angle speed supplied from the steering angle speed sensor.

Note that a process of determining the return steering state by the return steering determining section 631 is not limited to the above example. The return steering determining section 631 can be configured to determine whether or not the steering member 410 is in the return steering state, with reference to the torque sensor signal indicative of a result of detection by the torque sensor 430 and a rotation direction of the motor which is provided in the torque applying section 460. In this configuration, for example, the return steering determining section 631 can be configured to determine that the steering member 410 is in the return steering state in a case where a sign of the torque sensor signal and a sign of the rotation direction of the motor are different from each other.

The sign of the torque sensor signal here can be arranged, for example, such that the sign is positive in a case where the torsion bar is twisted in a clockwise direction whereas the sign is negative in a case where the torsion bar is twisted in a counterclockwise direction. The sign of the rotation direction of the motor can be arranged such that the sign is positive in a case where the motor rotating in that rotation direction allows a twist of the torsion bar in the clockwise direction to be eliminated whereas the sign is negative in a case where the motor rotating in that rotation direction allows a twist of the torsion bar in the counterclockwise direction to be eliminated.

The turn steering speed determining section 632 determines whether or not the steering angle speed calculated with reference to the steering angle supplied from the steering angle sensor 440 or an absolute value thereof is not less than a first predetermined value. In a case where the steering angle speed or the absolute value thereof is not less than the first predetermined value, the turn steering speed determining section 632 outputs as a determination result or otherwise, outputs as a determination result.

The roll rate determining section 633 determines whether or not the roll rate value supplied from the suspension control section 650 or an absolute value thereof is less than a second predetermined value. In a case where the roll rate value or the absolute value thereof is less than the second predetermined value, the roll rate determining section 633 outputs "1" as a determination result or otherwise, outputs "0" as a determination result.

The logical conjunction calculating section 634 performs a logical conjunction of the determination results from the return steering determining section 631, the turn steering speed determining section 632 and the roll rate determining section 633, and outputs a result of the logical conjunction. In other words, the logical conjunction calculating section 634 outputs "1" in a case where all the determination results outputted from the return steering determining section 631, the turn steering speed determining section 632, and the roll rate determining section 633 are "1", and otherwise, outputs "0".

The moving average calculating section 635 calculates a moving average of the above output from the logical conjunction calculating section 634, and outputs a result of this calculation. Note that the moving average calculating section 635 can be a low-pass filter.

The gain determining section 636 determines the gain coefficient in accordance with an output result of the moving average calculating section 635, and supplies, to the multiplying section 640, the gain coefficient thus determined. More specifically, in a case where a value obtained as a result of calculation of the moving average by the moving average calculating section 635 is more than 0, the gain determining section 636 determines a gain coefficient of more than 1. Furthermore, the gain determining section 636 sets a larger gain coefficient when the value obtained as the result of moving average calculation by the moving average calculating section 635 is larger. In other words, the gain determining section sets the gain coefficient such that as the value obtained as the result of moving average calculation by the moving average calculating section 635 increases, a reaction force applied to the steering member 410 increases.

The multiplying section 640 multiplies, by the gain coefficient determined by the gain determining section 636, the correction control variable determined by the correction control variable determining section 624, and supplies, to the control variable correcting section 612, a gained correction control variable which has been obtained by the above multiplication.

The control variable correcting section 612 generates a steering control variable by adding, to the control variable calculated by the control variable calculating section 611, the gained correction control variable which is supplied from the multiplying section 640. In other words, the control variable correcting section 612 corrects the control variable calculated by the control variable calculating section 611, with reference to the roll rate of the vehicle body 200, the steering angle of the steering member 410 and the steering angle speed of the steering member 410.

In this way the control variable correcting section 612 corrects, with reference to the roll rate of the vehicle body 200, the control variable calculated by the control variable calculating section 611. This makes it possible to apply, to the steering member 410, an assist torque or reaction torque which causes a driver to feel less discomfort. Further, the above correction is carried out, additionally with reference to the steering angle of the steering member 410 and the steering angle speed of the steering member 410. This makes it possible to apply, to the steering member 410, an assist torque or reaction torque which causes a driver to feel lesser discomfort.

Further, in the above configuration, the control variable correcting section 612 corrects the control variable in a case where (i) the steering member 410 is in the return steering state, (ii) the steering angle speed of the steering member 410 or the absolute value thereof is not less than the first predetermined value, and (iii) the roll rate value supplied from the suspension control section 650 or the absolute value thereof is less than the second predetermined value.

The inventors have recognized that in a case where (i) the steering member is in the return steering state, (ii) the steering angle speed of the steering member or the absolute value thereof is not less than the first predetermined value, and (iii) the roll rate value or the absolute value thereof is less than the second predetermined value, a phenomenon of so-called "torque loss" tends to occur.

Here, the following will describe a specific process in which the "torque loss" occurs. First, when a driver turns a steering wheel, rolling of the vehicle 900 occurs. The occurrence of the rolling leads to contraction of the hydraulic shock absorber which is provided in the suspension 100. Then, a positional relation between the tie rod and the lower arm changes. This consequently causes a change in toe angle. Further, this causes the rack shaft 480 to be pulled toward the hydraulic shock absorber which has contracted. In a case where the driver returns the steering member 410 in the above state, a reaction torque generated is only a reaction torque smaller than driver's expectation in a configuration including no gain calculating section 630. This may result in the phenomenon of "torque loss".

In the above configuration including the gain calculating section 630, the phenomenon of "torque loss" can be suitably prevented. Accordingly, it is possible to apply an assist torque or reaction torque which causes a driver to feel lesser discomfort.

In addition, in the above configuration, the control variable correcting section 612 corrects the control variable so that the reaction force applied to the steering member 410 will increase, in cases where (i) the steering member 410 is in the return steering state, (ii) the steering angle speed of the steering member 410 or the absolute value thereof is not less than the first predetermined value, and (iii) the roll rate value supplied from the suspension control section 650 or the absolute value thereof is less than the second predetermined value, as compared to otherwise cases.

Therefore, in the above configuration, the phenomenon of "torque loss" can be more suitably prevented. Accordingly, it is possible to apply an assist torque or reaction torque which causes a driver to feel lesser discomfort.

(Suspension Control Section)

Figure 5:
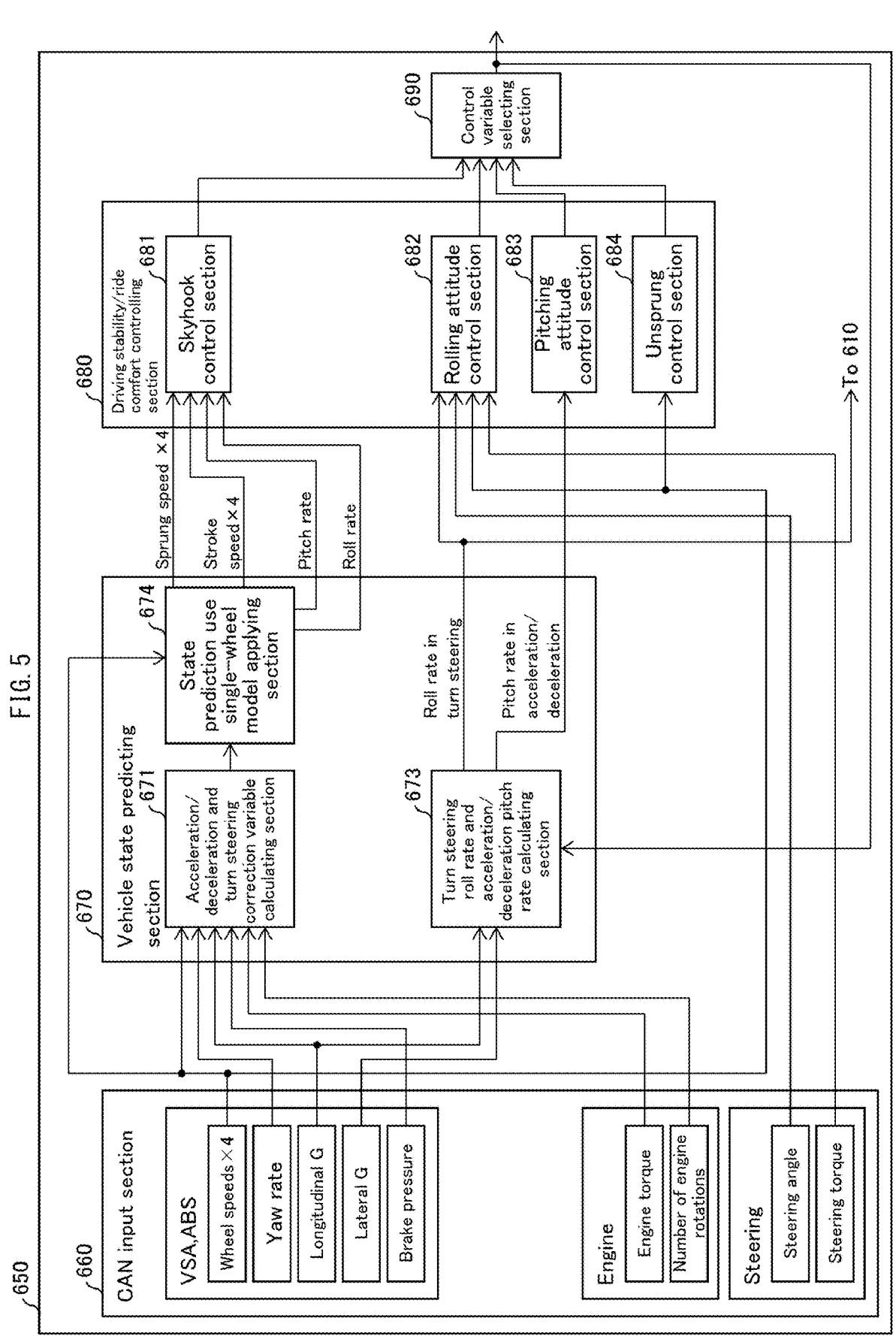
FIG. 5 is a block diagram illustrating an example configuration of a suspension control section in accordance with an embodiment of the present invention.

Next, the following will discuss a suspension control section with reference to FIG. 5. FIG. 5 is a block diagram illustrating an example configuration of the suspension control section 650.

The suspension control section 650 includes a CAN input section 660, a vehicle state predicting section 670, a driving stability/ride comfort controlling section 680, and a control variable selecting section 690, as illustrated in FIG. 5.

The CAN input section 660 obtains various signals via the CAN 370. As illustrated in FIG. 5, the CAN input section 660 obtains the following signals (sensors in parentheses are signal sources).

wheel speeds of four wheels (wheel speed sensors 320A to 320D)
  yaw rate (yaw rate sensor 350)
  longitudinal G (longitudinal G sensor 340)
  lateral G (lateral G sensor 330)
  brake pressure (brake pressure sensor 530)
  engine torque (engine torque sensor 510)
  number of engine rotations (engine speed sensor 520)
  steering angle (steering angle sensor 440)
  steering torque (torque sensor 430)

The vehicle state predicting section 670 predicts the state of the vehicle 900 with reference to the various signals obtained by the CAN input section 660. The vehicle state predicting section 670 outputs, as results of the above prediction, sprung speeds of the four wheels, stroke speeds of the four wheels, a pitch rate, a roll rate, a roll rate in turn steering, and a pitch rate in acceleration/deceleration.

The vehicle state predicting section 670 includes an acceleration/deceleration and turn steering correction variable calculating section 671, a turn steering roll rate and acceleration/deceleration pitch rate calculating section 673, and a state prediction use single-wheel model applying section 674, as illustrated in FIG. 5.

The acceleration/deceleration and turn steering correction variable calculating section 671 calculates, with reference to the yaw rate, the longitudinal G, the wheel speeds of the four wheels, the brake pressure, the engine torque, and the number of rotations of engine, a speed in a longitudinal direction of the vehicle body, a ratio of an inner wheel difference (difference between tracks followed by front and back inner wheels in turning) and an outer wheel difference (difference between tracks followed by front and back outer wheels in turning), and an adjustment gain, and supplies results of the above calculation to the state prediction use single-wheel model applying section 674.

The turn steering roll rate and acceleration/deceleration pitch rate calculating section 673 calculates the roll rate in turn steering and the pitch rate in acceleration/deceleration, with reference to the longitudinal G and the lateral G. Results of this calculation are supplied to the state prediction use single-wheel model applying section 674.

Further, the turn steering roll rate and acceleration/deceleration pitch rate calculating section 673 supplies, as the roll rate value, the roll rate in turn steering thus calculated to the steering control section 610. The turn steering roll rate and acceleration/deceleration pitch rate calculating section 673 can be configured to further refer to the suspension control variable outputted from the control variable selecting section 690. The details of the turn steering roll rate and acceleration/deceleration pitch rate calculating section 673 will be described later with reference to a different drawing.

As described above, the turn steering roll rate and acceleration/deceleration pitch rate calculating section 673 supplies, to the steering control section 610, the roll rate in turn steering, as the roll rate value, which roll rate has been calculated with reference to the longitudinal G and the lateral G. Then, the steering control section 610 corrects the control variable for controlling the magnitude of the assist torque or the reaction torque with reference to the roll rate. This allows the steering control section 610 to more suitably correct the magnitude of the assist torque or the reaction torque.

Further, if the turn steering roll rate and acceleration/deceleration pitch rate calculating section 673 is configured to further refer to the suspension control variable outputted from the control variable selecting section 690 as described above, the steering control section 610 can more suitably correct the magnitude of the magnitude of the assist torque or the reaction torque.

The state prediction use single-wheel model applying section 674 applies, to each wheel, a state prediction use single-wheel model and calculates the sprung speeds of the four wheels, the stroke speeds of the four wheels, the pitch rate, and the roll rate, with reference to the results of the calculation by the acceleration/deceleration and turn steering correction variable calculating section 671. Results of this calculation are supplied to the driving stability/ride comfort controlling section 680.

The driving stability/ride comfort controlling section 680 includes a skyhook control section 681, a rolling attitude control section 682, a pitching attitude control section 683, and an unsprung control section 684.

The skyhook control section 681 suppresses shaking of the vehicle when the vehicle goes over a bumpy road surface and carries out ride comfort control (damping control) for increasing ride comfort. The skyhook control section 681 determines a desired skyhook control variable, with reference to, for example, the sprung speeds of the four wheels, the stroke speeds of the four wheels, the pitch rate, and the roll rate, and supplies a result of this determination to the control variable selecting section 690.

More specifically, for example, the skyhook control section 681 sets a damping force base value on the basis of the sprung speeds with reference to a sprung-damping force map. Further, the skyhook control section 681 calculates a desired skyhook damping force by multiplying, by a skyhook gain, the damping force base value thus set. Then, the skyhook control section 681 determines the desired skyhook control variable on the basis of the desired skyhook damping force and the stroke speeds.

The rolling attitude control section 682 carries out rolling attitude control by calculating desired control variables with reference to the roll rate in turn steering, the steering angle signal indicative of the steering angle, the steering torque signal indicative of the steering torque, and a wheel speed signal indicative of the wheel speeds of four wheels. The desired control variables thus calculated are supplied to the control variable selecting section 690. A specific configuration of the rolling attitude control section 682 will be described later.

Further, though the rolling attitude control section 682 obtains the steering torque signal via the CAN 370 in the example configuration illustrated in FIG. 5, the rolling attitude control section 682 can be configured to obtain the steering torque signal from the steering control section 610 as described later. In such a configuration, it is not necessary for the rolling attitude control section 682 to obtain the steering torque signal via the CAN 370. Accordingly, the configuration of Embodiment 1 makes it possible to reduce transmission load on the CAN 370.

Note that the rolling attitude control section 682 can be configured to also obtain the steering angle signal from the steering control section 610. This makes it possible to further reduce the transmission load on the CAN 370.

Since the rolling attitude control section 682 carries out rolling attitude control with reference to the roll rate in turn steering which roll rate has been calculated by the turn steering roll rate and acceleration/deceleration pitch rate calculating section 673 as described above, it is possible to carry out a suitable attitude control. Further, the roll rate in turn steering calculated by the turn steering roll rate and acceleration/deceleration pitch rate calculating section 673 is used not only for the rolling attitude control by the rolling attitude control section 682 but also for correction of the magnitude of the assist torque or the reaction torque by the steering control section 610 as described above. This makes it possible to carry out a suitable attitude control and to provide a feeling of comfortable steering while suppressing an increase in the number of constituent elements.

The pitching attitude control section 683 carries out pitching control with reference to the pitch rate in acceleration/deceleration, determines a desired pitching control variable, and then supplies a result of this determination to the control variable selecting section 690.

The unsprung control section 684 carries out damping control below a spring of the vehicle 900 with reference to the wheel speeds of the four wheels, and determines a desired unsprung damping control variable. A result of this determination is supplied to the control variable selecting section 690.

The control variable selecting section 690 selects and outputs, as the suspension control variable, a desired control variable whose value is the largest from among the desired skyhook control variable, a steering angle proportional desired control variable, a steering angle speed proportional desired control variable, a roll rate proportional desired control variable, the desired pitching control variable, and the desired unsprung damping control variable.

(Turn Steering Roll Rate and Acceleration/Deceleration Pitch Rate Calculating Section)

Next, the following will specifically describe the turn steering roll rate and acceleration/deceleration pitch rate calculating section 673 with reference to a different drawing.

Figure 6:
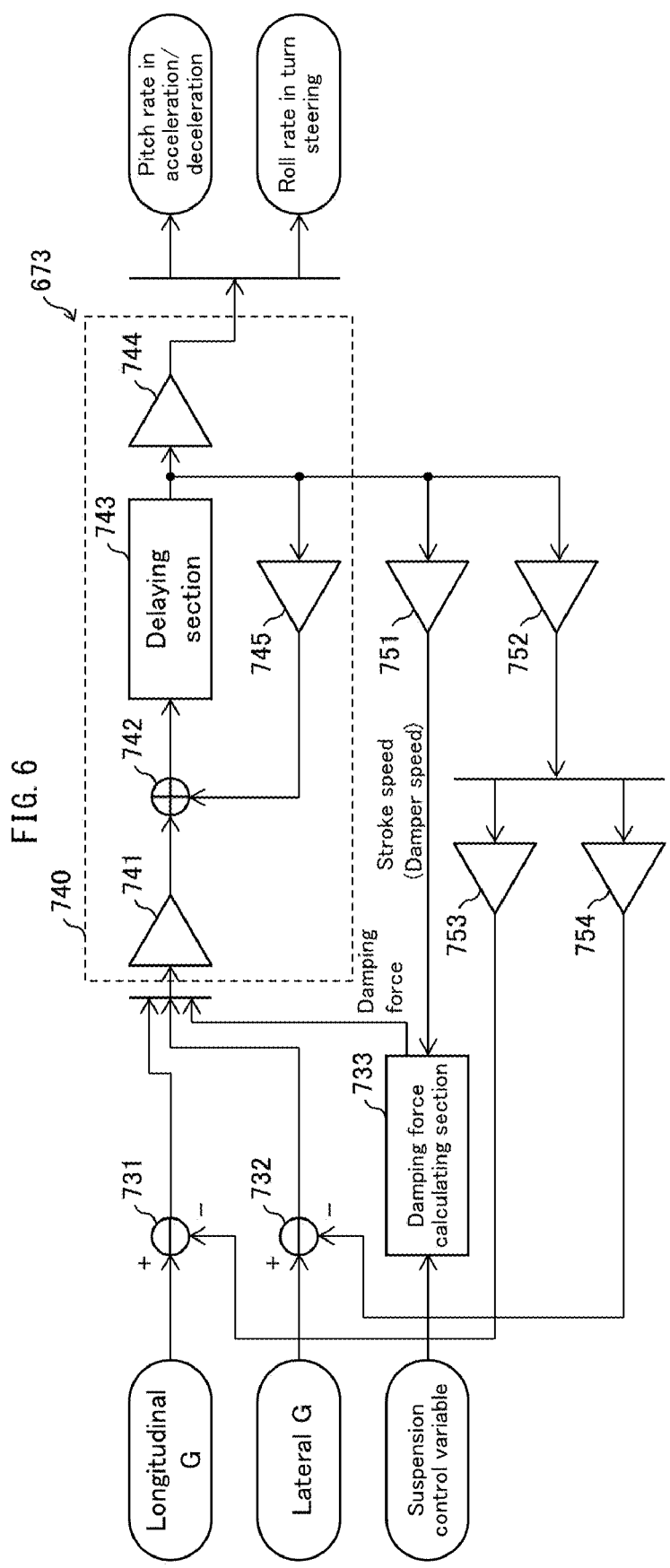
FIG. 6 is a block diagram illustrating an example configuration of a turn steering roll rate and acceleration/deceleration pitch rate calculating section in accordance with an embodiment of the present invention.

FIG. 6 is a block diagram illustrating an example configuration of the turn steering roll rate and acceleration/deceleration pitch rate calculating section 673. The turn steering roll rate and acceleration/deceleration pitch rate calculating section 673 includes subtracting sections 731 and 732, a damping force calculating section 733, a model applying section 740, and amplifying sections 751 to 754, as illustrated in FIG. 6.

Further, the model applying section 740 includes amplifying sections 741, 744, and 745, an adding section 742, and a delaying section 743.

The subtracting section 731 subtracts, from a signal indicative of the longitudinal G, an output signal from the amplifying section 753, and outputs a result of this subtraction to the amplifying section 741.

The subtracting section 732 subtracts, from a signal indicative of the lateral G, an output signal from the amplifying section 754, and outputs a result of this subtraction to the amplifying section 741.

The damping force calculating section 733 calculates a damping force of each wheel, with reference to the suspension control variable and an output from the amplifying section 751. Here, the output from the amplifying section 751 corresponds to an estimated value for a stroke speed (damper speed) of the hydraulic shock absorber which is provided in the suspension 100. Further, the damping force of each wheel is calculated by the damping force calculating section 733 with reference to a damping force map.

The model applying section 740 calculates the pitch rate in acceleration/deceleration, by applying a pitching behavior model to the longitudinal G after subtraction, which longitudinal G is outputted from the subtracting section 731, and the damping force of each wheel, which damping force is outputted from the damping force calculating section 733.

The model applying section 740 calculates the roll rate in turn steering, by applying a rolling behavior model to the lateral G after subtraction, which lateral G is outputted from the subtracting section 732, and the damping force of each wheel, which damping force is outputted from the damping force calculating section 733.

The pitch rate in acceleration/deceleration and the roll rate in turn steering are calculated by the model applying section 740, by adjusting respective rates of amplification in the amplifying sections 741, 744, and 745 and an amount of delay by the delaying section 743.

The amplifying section 741 amplifies an output from each of the subtracting section 731, the subtracting section 732, and the damping force calculating section 733, and supplies a result of this calculation to the adding section 742. The adding section 742 adds, to an output from the amplifying section 741, a value obtained by amplifying an output from the delaying section 743 by the amplifying section 745, and supplies a result of this addition to the delaying section 743.

The amplifying section 744 outputs the output from the delaying section 743 as the pitch rate in acceleration or the roll rate in turn steering.

The amplifying section 751 amplifies the output from the delaying section 743, and supplies a result of this amplification to the damping force calculating section 733. The amplifying section 752 amplifies the output from the delaying section 743. The output from the amplifying section 751 is amplified by the amplifying section 753 or the amplifying section 754, and then inputted to the subtracting section 731 or the subtracting section 732.

Note that the turn steering roll rate and acceleration/deceleration pitch rate calculating section 673 can output "0" as a reference value of the roll rate in turn steering in a case where the inclination of the vehicle 900 has not changed for a predetermined minute time. Further, the turn steering roll rate and acceleration/deceleration pitch rate calculating section 673 can provide the roll rate in turn steering with a dead zone of approximately ±0.5. Here, the sign "+" indicates a left side of the vehicle 900 and the sign "−" indicates a right side of the vehicle 900.

(Rolling Attitude Control Section 682)

The rolling attitude control section 682 calculates the suspension control variable for controlling the damping force of the suspension, in accordance with a result of determination by the road surface determining section.

Figure 7:
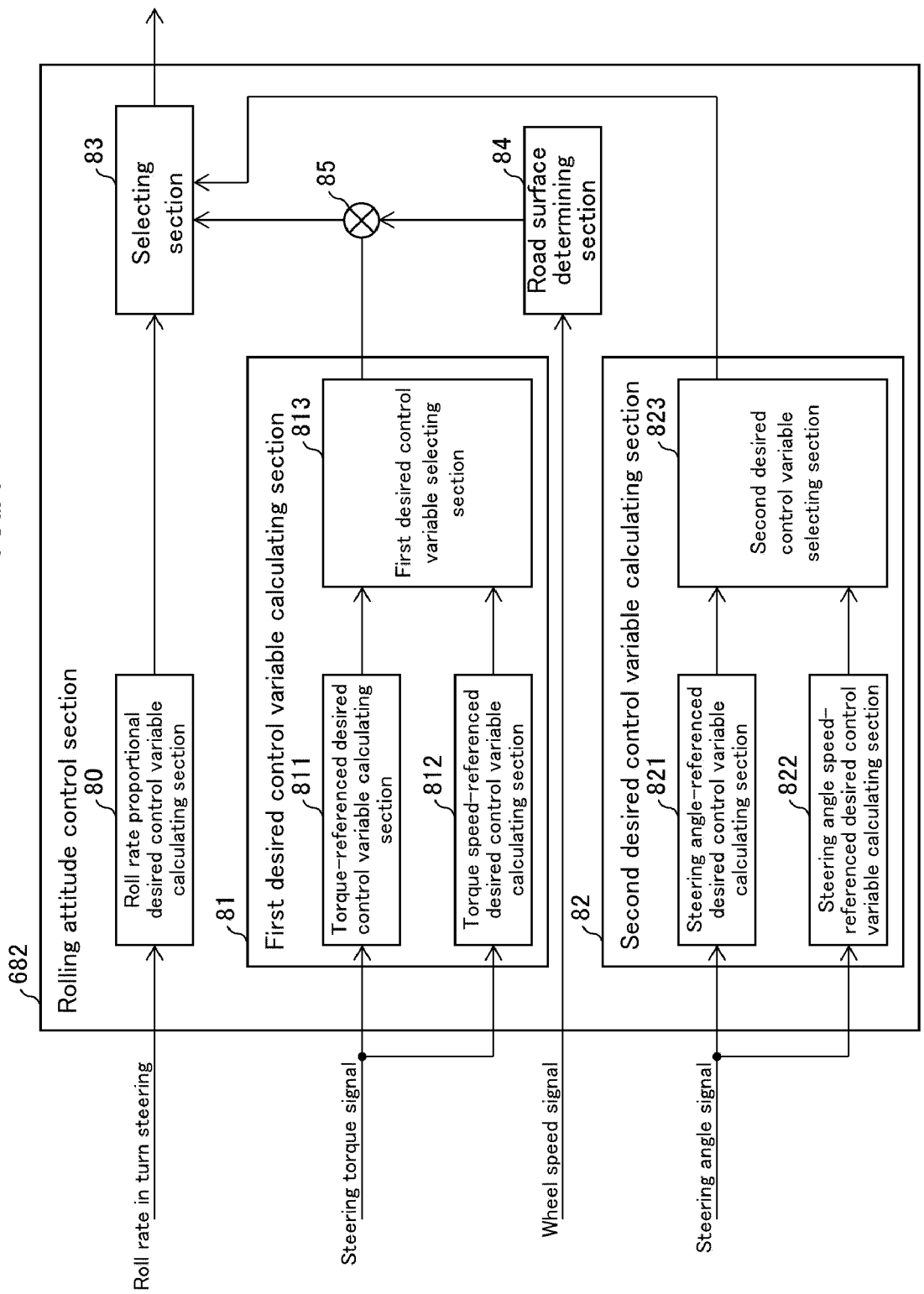
FIG. 7 is a block diagram illustrating an example configuration of a rolling attitude control section in accordance with an embodiment of the present invention.

The following will discuss a specific configuration of the rolling attitude control section 682, with reference to FIG. 7. FIG. 7 is a block diagram illustrating an example configuration of the rolling attitude control section 682. The rolling attitude control section 682 calculates a steering-based desired control variable, with reference to the steering torque signal, the steering angle signal, and the wheel speed signal. The steering-based desired control variable becomes a candidate for the suspension control variable. The steering-based desired control variable calculated by the rolling attitude control section 682 here becomes the suspension control variable, when selected by the control variable selecting section 690. Therefore, the rolling attitude control section 682 can be also expressed as a section which calculates the suspension control variable.

As illustrated in FIG. 7, the rolling attitude control section 682 includes a roll rate proportional desired control variable calculating section 80, a first desired control variable calculating section 81, a second desired control variable calculating section 82, a selecting section 83, a road surface determining section (road surface determining device) 84, and a multiplying section 85.

The roll rate proportional desired control variable calculating section 80 calculates the roll rate proportional desired control variable, with reference to the roll rate in turn steering supplied from the turn steering roll rate and acceleration/deceleration pitch rate calculating section 673.

The first desired control variable calculating section 81 calculates a first desired control variable with reference to the steering torque signal. Specifically, the first desired control variable calculating section 81 calculates the first desired control variable with reference to the steering torque signal so that rolling of the vehicle 900 will be suppressed and an attitude of the vehicle 900 will be flatter. For example, in a case where the steering member 410 is steered to turn in a certain turning direction and the vehicle 900 accordingly travels along a curve intended by the turning direction of the steering member 410, the first desired control variable is calculated so as to increase the damping force of the suspension on an outer side of the curve (i.e., on a side opposite to the turning direction). In other words, the first desired control variable is calculated so as to make the suspension stiff on the side opposite to the turning direction. Furthermore, it is also possible to calculate the first desired control variable which increases the damping force of the suspension on an inner side of the curve in addition to the damping force of the suspension on the outer side of the curve.

The first desired control variable calculating section includes a torque-referenced desired control variable calculating section 811, a torque speed-referenced desired control variable calculating section 812, and a first desired control variable selecting section 813, as illustrated in FIG. 7.

The torque-referenced desired control variable calculating section 811 calculates a torque-referenced desired control variable with reference to the torque indicated by the steering torque signal. The torque speed-referenced desired control variable calculating section 812 calculates a torque speed with reference to a change over time in the torque indicated by the steering torque signal, and further calculates a torque speed-referenced desired control variable with reference to the torque speed thus calculated.

The first desired control variable selecting section 813 selects, as a torque-derived desired control variable (first desired control variable), a desired control variable having a higher value from between the torque-referenced desired control variable and the torque speed-referenced desired control variable.

The second desired control variable calculating section calculates a second desired control variable with reference to the steering angle signal. Specifically, the second desired control variable calculating section 82 calculates the second desired control variable with reference to the steering angle signal so that the rolling of the vehicle 900 will be suppressed and the attitude of the vehicle 900 will be flatter. For example, in a case where the steering member 410 is steered to turn in a certain turning direction and the vehicle 900 accordingly travels along a curve intended by the turning direction of the steering member 410, the second desired control variable is calculated so as to increase the damping force of the suspension on the outer side of the curve (i.e., on the side opposite to the turning direction). In other words, the second desired control variable is calculated so as to make the suspension stiff on the side opposite to the turning direction. Furthermore, it is also possible to calculate the second desired control variable which increases the damping force of the suspension on the inner side of the curve in addition to the damping force of the suspension on the outer side of the curve.

The second desired control variable calculating section includes a steering angle-referenced desired control variable calculating section 821, a steering angle speed-referenced desired control variable calculating section 822, and a second desired control variable selecting section 823, as illustrated in FIG. 7.

The steering angle-referenced desired control variable calculating section 821 calculates a steering angle-referenced desired control variable with reference to the steering angle indicated by the steering angle signal. The steering angle speed-referenced desired control variable calculating section 822 calculates a steering angle speed with reference to a change over time in the steering angle indicated by the steering angle signal, and further calculates a steering angle speed-referenced desired control variable with reference to the steering angle speed thus calculated.

The second desired control variable calculating section selects, as a steering angle-derived desired control variable (second desired control variable), a desired control variable having a higher value from between the steering angle-referenced desired control variable and the steering angle speed-referenced desired control variable.

The road surface determining section 84 determines a road surface condition with reference to the wheel speed signal and supplies a coefficient indicative of a result of this determination to the multiplying section 85. A specific example configuration of the road surface determining section 84 will be described later.

The multiplying section 85 multiplies, by the coefficient supplied by the road surface determining section 84, the first desired control variable calculated by the first desired control variable calculating section 81, and supplies, to the selecting section 83, the first desired control variable multiplied by the coefficient.

The selecting section 83 selects, as the steering-based desired control variable, a desired control variable having a higher value from among the first desired control variable multiplied by the coefficient, the second desired control variable, and the roll rate proportional desired control variable. Then, the selecting section 83 outputs the desired control variable thus selected.

Since as described above, the rolling attitude control section 682 calculates the steering-based desired control variable, which becomes a candidate for the suspension control variable, in accordance with a result of determination by the road surface determining section, it is possible to appropriately control the damping force of the suspension in accordance with the road surface condition.

Further, the rolling attitude control section 682 includes the first desired control variable calculating section for calculating the first desired control variable, the multiplying section for multiplying a value of the first desired control variable by the coefficient in accordance with the result of determination by the road surface determining section 84, and the selecting section 83 for selecting the steering-based desired control variable, which is a candidate for the suspension control variable, from among a plurality of candidates including the first desired control variable multiplied by the coefficient. This makes it possible to suitably set the desired control variable in accordance with the result of determination by the road surface determining section.

In addition, the first desired control variable is calculated with reference to the steering torque signal indicative of the steering torque which is applied to the steering member 410, and then, the first desired control variable is multiplied by the coefficient indicative of the result of the above-described road surface determination. This allows for a control in which the first desired control variable which is the torque-derived desired control variable is multiplied by a coefficient smaller than 1 in accordance with the road surface condition, so that the torque-derived desired control variable is unlikely to be selected as the suspension control variable.

(Road Surface Determining Section)

Figure 8:
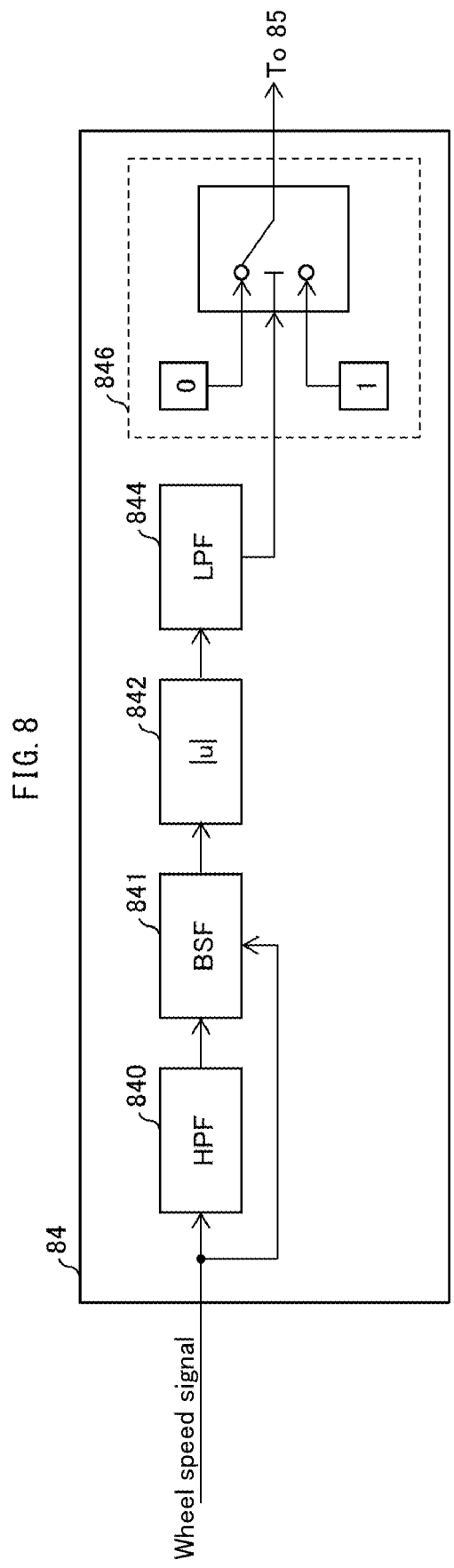
FIG. 8 is a block diagram illustrating an example configuration of a road surface determining section in accordance with an embodiment of the present invention.

Next, the following will more specifically discuss the road surface determining section 84 with reference to FIG. 8. The road surface determining section 84 is configured to determine the road surface condition with reference to a reference signal for carrying out the road surface determination, and to output a coefficient indicative of a result of the road surface determination.

In Embodiment 1, the following will discuss a configuration in which the wheel speed signal indicative of the wheel speeds of the four wheels is referred to as the above reference signal for carrying out the road surface determination. In general, in a case where a road surface is bumpy, a radius of the tire 310 becomes smaller due to a protrusion of the road surface and the radius of the tire 310 becomes larger due to a depression of the road surface. When the radius of the tire 310 varies as described above, the wheel speed accordingly varies. Therefore, it can be said that the wheel speed signal is a suitable signal for determining the road surface condition.

Note that a configuration in which a reference signal other than the wheel speed signal is referred to will be discussed in Embodiment 3.

FIG. 8 is a block diagram illustrating an example configuration of the road surface determining section 84. As illustrated in FIG. 8, the road surface determining section 84 includes a high-pass filter (HPF) 840, a band-stop filter (BPF) 841, an absolute value calculating section 842, a low-pass filter (LPF) 844, and a coefficient determining section 846. As illustrated in FIG. 8, the wheel speed signal is inputted to the high-pass filter 840, and the low-pass filter 844 is provided in a stage subsequent to the high-pass filter 840.

Note that the order of the high-pass filter 840 and the band-stop filter 841 can be reversed from the order illustrated in FIG. 8. Even in this case, the low-pass filter 844 is provided in a stage subsequent to the high-pass filter 840 and the band-stop filter 841.

The high-pass filter 840 acts on the wheel speed signal, and extracts a variation in wheel speed due to the road surface condition, by removing or decreasing, from the wheel speed signal, a frequency component whose frequency is not more than a first cutoff frequency. Here, the frequency component to be removed or decreased by the high-pass filter 840 includes a frequency component caused by the variation in wheel speed due to steering, and/or the like. Note that the first cutoff frequency in the high-pass filter 840 and a first order of the high-pass filter 840 can be freely set. Accordingly, a more suitable value can be set on the basis of experimental values.

(Band-Stop Filter 841)

In a case where the band-stop filter 841 is provided on a downstream of the high-pass filter 840, the band-stop filter 841 acts on the wheel speed signal on which the high-pass filter 840 has acted. In contrast, in a case where the band-stop filter 841 is provided on an upstream of the high-pass filter 840, the band-stop filter 841 acts on the wheel speed signal on which the high-pass filter 840 has not yet acted.

In either case, the band-stop filter 841 decreases or blocks signals having frequencies within a cutoff frequency band, among processing target signals which are inputted to the band-stop filter 841. On the other hand, with regard to signals having frequencies within frequency bands except for the cutoff frequency band, the band-stop filter 841 leaves those signals unchanged. The cutoff frequency band here is designated by a center frequency and a bandwidth.

Further, an input to the band-stop filter 841 in accordance with Embodiment 1 includes a vehicle speed signal as a signal for determining the cutoff frequency band, and the band-stop filter 841 is configured to be capable of changing the cutoff frequency band in accordance with the wheel speed signal. More specifically, the band-stop filter 841 is configured to be capable of changing the center frequency of the cutoff frequency band in accordance with a vehicle speed indicated by the wheel speed signal. In one example, the band-stop filter 841 sets the center frequency Fc(Hz) of the cutoff frequency band to:

$$Fc=v/(\pi \times d),$$

where v represents the vehicle speed (m/sec) indicated by the wheel speed signal, and d represents a diameter (m) of a tire. Note that the band-stop filter 841 can be configured to further change the bandwidth of the cutoff frequency band in accordance with the wheel speed signal.

As described above, the band-stop filter 841 has the cutoff frequency band in accordance with the wheel speed signal. Accordingly, the road surface determining section 84 can determine the road surface condition after removing, from the wheel speed signal, a contribution of a variation in wheel speed due to eccentricity of the tire 310. This makes it possible to appropriately carry out the road surface determination.

The absolute value calculating section 842 calculates an absolute value of an output signal from the high-pass filter 840 and provides the absolute value to the low-pass filter 844.

The low-pass filter 844 generates and outputs a signal indicative of the variation in wheel speed by removing or decreasing, from an output from the absolute value calculating section 842, a frequency component whose frequency is not less than a second cutoff frequency. In other words, the low-pass filter 844 calculates the variation in wheel speed as a certain kind of energy which is an indicator of the road surface condition. The second cutoff frequency in the low-pass filter 844 and a second order of the low-pass filter 844 can be freely set. Accordingly, a more suitable value can be set on the basis of experimental values.

The coefficient determining section 846 outputs a coefficient in accordance with an output value from the low-pass filter 844. For example, the coefficient determining section 846 sets the coefficient such that the coefficient outputted in a case where the output value from the low-pass filter 844 is not less than a predetermined threshold is smaller than the coefficient outputted in a case where the output value from the low-pass filter 844 is less than the predetermined threshold.

In a more specific example, the coefficient determining section 846 outputs "0" as the coefficient if the output value from the low-pass filter 844 is not less than the predetermined threshold, whereas the coefficient determining section 846 outputs "1" as the coefficient if the output value from the low-pass filter 844 is less than the predetermined threshold. A case where the output value from the low-pass filter 844 is not less than the predetermined threshold corresponds to a case where the road surface is rough, whereas a case where the output value from the low-pass filter 844 is less than the predetermined threshold corresponds to a case where the road surface is not rough. In this way, the coefficient determining section 846 outputs a coefficient having a value in accordance with the road surface condition.

In the road surface determining section 84 configured as above, the high-pass filter 840 extracts a variation in wheel speed due to the road surface condition, the band-stop filter 841 removes a contribution of the variation in wheel speed due to eccentricity of the tire 310, the low-pass filter 844 outputs a signal indicative of the variation in wheel speed, and the coefficient determining section determines, in accordance with the signal outputted from the low-pass filter 844, the value of a coefficient by which the first desired control variable is multiplied.

The above configuration makes it possible to suitably determine the value of the coefficient in accordance with the result of determination of the road surface condition which result is obtained with reference to the wheel speed signal. Further, since the band-stop filter 841 removes the contribution of the variation in wheel speed due to eccentricity of the tire 310, it is possible to carry out a more accurate determination.

Further, as described above, the coefficient determining section 846 sets the coefficient such that the coefficient outputted in a case where the output value from the low-pass filter 844 is not less than a predetermined threshold is smaller than the coefficient outputted in a case where the output value from the low-pass filter 844 is less than the predetermined threshold.

In general, in some conditions of the road surface, higher ride comfort can be achieved by outputting the steering angle-derived desired control variable but no torque-derived desired control variable. The coefficient determining section 846 configured as above can output the steering angle-derived desired control variable in preference to the torque-derived desired control variable depending on road surface conditions. This makes it possible to achieve higher ride comfort.

Figure 9:
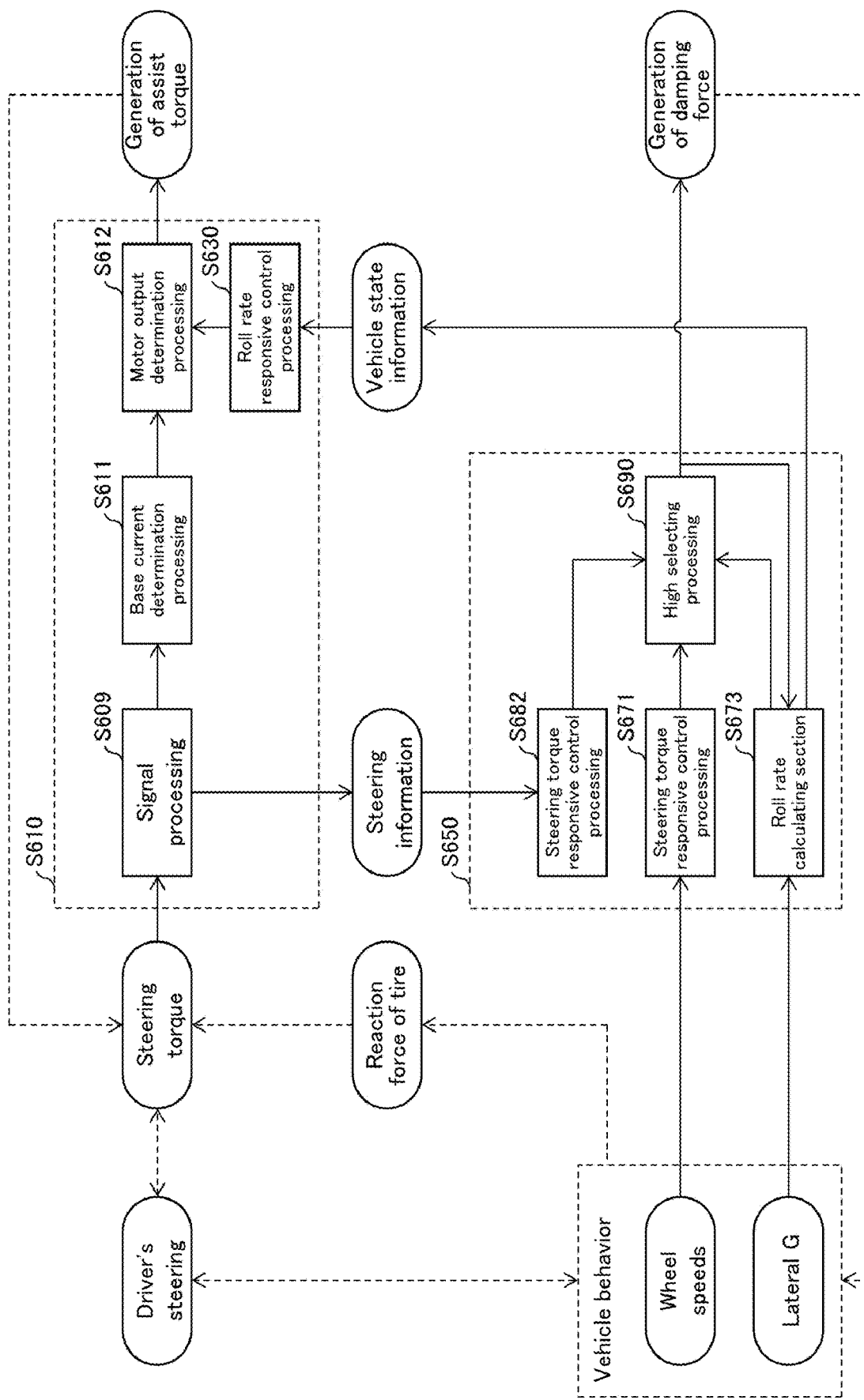
FIG. 9 is a flowchart illustrating a process flow of a steering-suspension cooperative control in accordance with an embodiment of the present invention.

FIG. 9 is a flowchart illustrating flows of various processes in a steering-suspension cooperative control in accordance with an embodiment of the present invention. The steering-suspension cooperative control is carried out by the steering and suspension control device which includes the steering control section 610 and the suspension control section 650.

A step group S610 illustrated in FIG. 9 is associated with a steering control process which is performed by the suspension control section 610 and a step group S650 is associated with a suspension control process which is carried out by the suspension control section 650. Note that processings described below indicate various steps which are performed by the steering control section 610 and the suspension control section 650.

Note that in FIG. 9, solid arrows show relativity of steps which are involved in exchange of various signals, and dashed arrows show other relativity of steps.

First, a steering torque is generated by driver's steering, as illustrated in FIG. 9.

(Step S609)

In step S609, signal processing is performed with respect to a steering torque signal indicative of a steering torque as one example of the steering information. The signal processing can include phase compensation processing with respect to the steering torque signal. This step is performed by, for example, the signal processing section 609 described above.

(Step S611)

Next, in step S611, base control variable determination processing is performed with reference to the steering torque signal having undergone the signal processing. This step is performed by, for example, calculation of a control variable (base control variable) by the control variable calculating section 611 described above.

(Step S630)

On the other hand, in step S630, roll rate responsive control processing is performed with reference to a roll rate value as an example of the vehicle state information. This step is performed by, for example, the (A) feedback section 620, the gain calculating section 630, and the multiplying section 640, so that the above-described gained correction control variable is calculated.

Note that the roll rate value referred to in this step is calculated in roll rate calculation processing (step S673) described later.

(Step 612)

Next, in step S612, motor output determination processing is performed. In step S612, a steering control variable, which defines a motor output, is calculated with reference to the base control variable calculated in the base control variable determination processing and the gained correction control variable calculated in the roll rate responsive control processing. This step is performed by, for example, the control variable correcting section 612 described above.

(Step 682)

On the other hand, in step S682, steering torque responsive control processing is performed with reference to the steering torque which has undergone the signal processing in S609, so that a desired control variable associated with the steering torque is calculated. This step is performed by, for example, the rolling attitude control section 682 described above. Note that in step S682, it is alternatively possible to refer to the steering torque prior to the signal processing in S609.

(Step S671)

In step S671, control processing with respect to a road surface input is performed with reference to wheel speeds, so that a desired control variable associated with the wheel speeds is calculated. This step is performed by, for example, the acceleration/deceleration and turn steering correction variable calculating section 671, the state prediction use single-wheel model applying section 674, and the skyhook control section 681 described above.

(Step S673)

Further in step S673, roll rate calculation processing with reference to a lateral G is performed, so that a roll rate value and a desired control variable associated with the lateral G are calculated. The roll rate value calculated in step S673 is referred to in the above-described roll rate responsive control processing (S630). This step is performed by, for example, the turn steering roll rate and acceleration/deceleration pitch rate calculating section 673 described above.

(Step S690)

In step S690, among the desired control variables calculated in steps S682, S671 and S673, respectively, a desired control variable having the highest value is outputted as a suspension control variable which defines a damping force of the suspension. This step is performed by, for example, the control variable selecting section 690 described above.

As illustrated in FIG. 9, in the steering-suspension cooperative control, the steering torque referred to in the steering control process S610 is referred to in the suspension control process S650, and the roll rate value, which is calculated in the suspension control process S650 and indicative of a vehicle state, is referred to in the steering control process S610. Therefore, as described below, there are at least two feedback loops including reaction of a driver.

(First Loop)

Driver's steering→steering torque→steering torque responsive control processing (S682)→generation of damping force→vehicle behavior→driver's steering (Second Loop)

Driver's steering→vehicle behavior→roll rate calculation processing (S673)→roll rate value→roll rate responsive control processing (S630)→motor output determination processing (S612)→generation of assist torque (or reaction torque)→steering torque→driver's steering The above-described configuration can provide the assist torque (or reaction torque) and the damping force of the suspension, which assist torque (or reaction torque) and damping force cause the driver to feel less discomfort. This makes it possible achieve higher ride comfort.

Embodiment 2

Though Embodiments 1 and 2 described a configuration in which a road surface determining section 84 refers to a wheel speed signal indicative of wheel speeds of four wheels, as a reference signal for road surface determination, an embodiment of the invention described in the present specification is not limited to such a configuration. The following will discuss a case where the road surface determining section 84 refers to a reference signal other than the wheel speed signal.

Note that in a case where the road surface determining section 84 refers to a reference signal described below, parameters, such as cutoff frequencies in a high-pass filter 840 and a low-pass filter 844, should be set to suitable values in accordance with the reference signal.

Further, the road surface determining section 84 can be configured to include a plurality of signal processing paths including the high-pass filter 840 and the low-pass filter 844, and to carry out road surface determination with reference to a plurality of signals from among various reference signals including the above-described wheel speed signal and various reference signals below. This configuration makes it possible to improve accuracy of the road surface determination.

(Example 1) Steering Angle Signal

The road surface determining section 84 can determine a road surface condition with reference to a steering angle signal indicative of a steering angle of a steering member 410. In general, in a case where a road surface is bumpy, the steering angle varies due to that bumpy road surface. Therefore, it can be said that the steering angle signal is a suitable signal for determining the road surface condition.

(Example 2) Steering Torque

The road surface determining section 84 can determine the road surface condition with reference to a steering torque signal indicative of a steering torque which is applied to the steering member 410. In general, in a case where a road surface is bumpy, the steering torque varies due to that bumpy road surface. Therefore, it can be said that the steering torque signal is a suitable signal for determining the road surface condition.

(Example 3) Rotation of Steering Assist Motor

The road surface determining section 84 can determine the road surface condition with reference to rotation of a motor (steering assist motor) which is provided in the torque applying section 460. In a case where a road surface is bumpy, the number of rotations of the steering assist motor varies due to that bumpy road surface. Therefore, it can be said that the number of rotations of the steering assist motor is a suitable signal for determining the road surface condition.

(Example 4) Yaw Rate Signal

The road surface determining section 84 can determine the road surface condition with reference to a yaw rate signal indicative of a yaw rate of a vehicle 900. In a case where a road surface is bumpy, variation in the yaw rate of the vehicle 900 is caused directly by that bumpy road surface or indirectly by that bumpy road surface via the steering torque and/or the like. Therefore, it can be said that the yaw rate signal is a suitable signal for determining the road surface condition.

(Example 5) Lateral G Signal and Longitudinal G Signal

The road surface determining section 84 can determine the road surface condition with reference to at least either one of a lateral G signal indicative of an acceleration in a lateral direction of the vehicle 900 and a longitudinal G signal indicative of an acceleration in a longitudinal direction of the vehicle 900. In a case where a road surface is bumpy, variation in the acceleration in the lateral direction of the vehicle 900 and variation in the acceleration in the longitudinal direction of the vehicle 900 are caused directly by that bumpy road surface or indirectly by that bumpy road surface via the steering torque and/or the like. Therefore, it can be said that the lateral G signal and the longitudinal G signal are suitable signals for determining the road surface condition.

(Example 6) Vertical G Signal

The vehicle 900 can be configured to include a vertical G sensor for detecting an acceleration in a vertical direction of the vehicle 900. Then, the road surface determining section 84 can be configured to determine the road surface condition with reference to the vertical G signal indicative of the acceleration in the vertical direction.

In a case where a road surface is bumpy, the acceleration in the vertical direction of the vehicle 900 varies due to that bumpy road surface. Therefore, it can be said that the vertical G signal is a suitable signal for determining the road surface condition.

(Example 7) Pitch Rate

The road surface determining section 84 can determine the road surface condition with reference to at least either one of a pitch rate calculated by a vehicle state predicting section 670 and a pitch rate in acceleration/deceleration which pitch rate is calculated by an acceleration/deceleration and turn steering correction variable calculating section 671. In a case where a road surface is bumpy, variation in the pitch rate is caused directly by that bumpy road surface or indirectly by that bumpy road surface via the steering torque and/or the like. Therefore, it can be said that the pitch rate is a suitable signal for determining the road surface condition.

Software Implementation Example

Control blocks of the ECU 600 (particularly, the steering control section 610 and the suspension control section 650) can be realized by a logic circuit (hardware) provided in an integrated circuit (IC chip) or the like or can be alternatively realized by software as executed by a central processing unit (CPU).

In the latter case, the ECU 600 includes a CPU that executes instructions of a program that is software realizing the foregoing functions; a read only memory (ROM) or a storage device (each referred to as "storage medium") in which the program and various kinds of data are stored so as to be readable by a computer (or a CPU); and a random access memory (RAM) in which the program is loaded. An object of the present invention can be achieved by a computer (or a CPU) reading and executing the program stored in the storage medium. Examples of the storage medium encompass "a non-transitory tangible medium" such as a tape, a disk, a card, a semiconductor memory, and a programmable logic circuit. The program can be supplied to the computer via any transmission medium (such as a communication network or a broadcast wave) which allows the program to be transmitted. Note that the present invention can also be achieved in the form of a computer data signal in which the program is embodied via electronic transmission and which is embedded in a carrier wave.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST 200 vehicle body
600 ECU (control device)
610 steering control section (first control section)
611 control variable calculating section
612 control variable correcting section
620 (A) feedback section
630 gain calculating section
650 suspension control section (second control section)
673 roll rate calculating section
900 vehicle

The invention claimed is:

1. A vehicle control device for controlling a vehicle, comprising:
a first control section configured to control a magnitude of an assist torque or reaction torque to be applied to a steering device for steering the vehicle, with reference to at least a steering torque applied to a steering member; and
a second control section configured to control a damping force of a suspension of the vehicle,
the first control section controlling the magnitude of the assist torque or reaction torque, additionally with reference to information which has been obtained or calculated by the second control section and is supplied from the second control section,
the second control section controlling the damping force of the suspension of the vehicle, with reference to the steering torque or information obtained or calculated by the first control section,
the second control section predicting a roll rate of the vehicle, and controlling the damping force of the suspension of the vehicle, with reference to at least the roll rate predicted, and
the information which has been obtained or calculated by the second control section being the roll rate predicted.

2. The vehicle control device as set forth in claim 1, wherein:
the first control section and the second control section are provided in an integrated manner.

3. The vehicle control device as set forth in claim 2, wherein:
the information obtained or calculated by the first control section is a steering torque signal supplied from the first control section.

4. The vehicle control device as set forth in claim 3, wherein:
the first control section includes:
a control variable calculating section configured to calculate a control variable for controlling the magnitude of the assist torque or reaction torque, with reference to the steering torque; and
a control variable correcting section configured to correct the control variable calculated by the control variable calculating section, with reference to the roll rate predicted, a steering angle of the steering member, and a steering angle speed of the steering member; and
the control variable correcting section corrects the control variable calculated by the control variable calculating section, so as to increase a reaction force applied to the steering member, in a case where (i) the steering member is in a return steering state, (ii) the steering angle speed of the steering member or an absolute value thereof is not less than a predetermined value, and (iii) the roll rate predicted or an absolute value thereof is less than a predetermined value.

5. The vehicle control device as set forth in claim 2, wherein:
the first control section includes:
a control variable calculating section configured to calculate a control variable for controlling the magnitude of the assist torque or reaction torque, with reference to the steering torque; and
a control variable correcting section configured to correct the control variable calculated by the control variable calculating section, with reference to the roll rate predicted, a steering angle of the steering member, and a steering angle speed of the steering member; and
the control variable correcting section corrects the control variable calculated by the control variable calculating section, so as to increase a reaction force applied to the steering member, in a case where (i) the steering member is in a return steering state, (ii) the steering angle speed of the steering member or an absolute value thereof is not less than a predetermined value, and (iii) the roll rate predicted or an absolute value thereof is less than a predetermined value.

6. The vehicle control device as set forth in claim 1, wherein:
the roll rate predicted is a roll rate calculated with reference to at least an acceleration in a lateral direction of the vehicle.

7. The vehicle control device as set forth in claim 6, wherein:
the information obtained or calculated by the first control section is a steering torque signal supplied from the first control section.

8. The vehicle control device as set forth in claim 7, wherein:
the first control section includes:
a control variable calculating section configured to calculate a control variable for controlling the magnitude of the assist torque or reaction torque, with reference to the steering torque; and
a control variable correcting section configured to correct the control variable calculated by the control variable calculating section, with reference to the roll rate predicted, a steering angle of the steering member, and a steering angle speed of the steering member; and
the control variable correcting section corrects the control variable calculated by the control variable calculating section, so as to increase a reaction force applied to the steering member, in a case where (i) the steering member is in a return steering state, (ii) the steering angle speed of the steering member or an absolute value thereof is not less than a predetermined value, and (iii) the roll rate predicted or an absolute value thereof is less than a predetermined value.

9. The vehicle control device as set forth in claim 6, wherein:
the first control section includes:
a control variable calculating section configured to calculate a control variable for controlling the magnitude of the assist torque or reaction torque, with reference to the steering torque; and
a control variable correcting section configured to correct the control variable calculated by the control variable calculating section, with reference to the roll rate predicted, a steering angle of the steering member, and a steering angle speed of the steering member; and
the control variable correcting section corrects the control variable calculated by the control variable calculating section, so as to increase a reaction force applied to the steering member, in a case where (i) the steering member is in a return steering state, (ii) the steering angle speed of the steering member or an absolute value thereof is not less than a predetermined value, and (iii) the roll rate predicted or an absolute value thereof is less than a predetermined value.

10. The vehicle control device as set forth in claim 1, wherein:
the information obtained or calculated by the first control section is a steering torque signal supplied from the first control section.

11. The vehicle control device as set forth in claim 10, wherein:
the first control section includes:
a control variable calculating section configured to calculate a control variable for controlling the magnitude of the assist torque or reaction torque, with reference to the steering torque; and
a control variable correcting section configured to correct the control variable calculated by the control variable calculating section, with reference to the roll rate predicted, a steering angle of the steering member, and a steering angle speed of the steering member; and
the control variable correcting section corrects the control variable calculated by the control variable calculating section, so as to increase a reaction force applied to the steering member, in a case where (i) the steering member is in a return steering state, (ii) the steering angle speed of the steering member or an absolute value thereof is not less than a predetermined value, and (iii) the roll rate predicted or an absolute value thereof is less than a predetermined value.

12. The vehicle control device as set forth in claim 1, wherein:
the first control section includes:
a control variable calculating section configured to calculate a control variable for controlling the magnitude of the assist torque or reaction torque, with reference to the steering torque; and
a control variable correcting section configured to correct the control variable calculated by the control variable calculating section, with reference to the roll rate predicted, a steering angle of the steering member, and a steering angle speed of the steering member; and
the control variable correcting section corrects the control variable calculated by the control variable calculating section, so as to increase a reaction force applied to the steering member, in a case where (i) the steering member is in a return steering state, (ii) the steering angle speed of the steering member or an absolute value thereof is not less than a predetermined value, and (iii) the roll rate predicted or an absolute value thereof is less than a predetermined value.

13. A vehicle comprising:
a vehicle control device configured to control the vehicle;
a torque applying section configured to apply an assist torque or reaction torque to a steering member; and
a suspension,
the vehicle control device including:
a first control section configured to control a magnitude of the assist torque or reaction torque to be applied to the steering member, with reference to at least a steering torque applied to the steering member; and
a second control section configured to predict a roll rate of the vehicle and control a damping force of the suspension of the vehicle, with reference to at least the roll rate of the vehicle,
the first control section controlling the magnitude of the assist torque or reaction torque, additionally with reference to the roll rate of the vehicle, the roll rate of the vehicle being information supplied from the second control section and having been predicted by the second control section,
the second control section controlling the damping force of the suspension of the vehicle, additionally with reference to the steering torque,
the torque applying section applying the assist torque or reaction torque to the steering member, in accordance with a control signal supplied from the first control section, and
the suspension varying the damping force in accordance with another control signal supplied from the second control section.

14. The vehicle as set forth in claim 6, wherein:
the first control section includes:
a control variable calculating section configured to calculate a control variable for controlling the magnitude of the assist torque or reaction torque, with reference to the steering torque; and
a control variable correcting section configured to correct the control variable calculated by the control variable calculating section, with reference to the roll rate predicted, a steering angle of the steering member, and a steering angle speed of the steering member; and
the control variable correcting section corrects the control variable calculated by the control variable calculating section, so as to increase a reaction force applied to the steering member, in a case where (i) the steering member is in a return steering state, (ii) the steering angle speed of the steering member or an absolute value thereof is not less than a predetermined value, and (iii) the roll rate predicted or an absolute value thereof is less than a predetermined value.

\* \* \* \* \*